(12) United States Patent
Van Den Enden et al.

(10) Patent No.: US 6,765,852 B1
(45) Date of Patent: Jul. 20, 2004

(54) METHOD OF STORING A DISC-ID ON A RECORD CARRIER, DEVICE AND RECORD CARRIER

(75) Inventors: Gijsbert J. Van Den Enden, Veldhoven (NL); Antonius A. M. Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/500,664

(22) Filed: Feb. 9, 2000

(30) Foreign Application Priority Data

Feb. 10, 1999 (EP) .......................... 99200386

(51) Int. Cl.⁷ ................................. G11B 7/24
(52) U.S. Cl. ................ 369/53.21; 369/53.22; 369/59.25; 369/275.3
(58) Field of Search .................. 369/53.2, 53.21, 369/53.22, 59.25, 275.3

(56) References Cited

U.S. PATENT DOCUMENTS

| | | | | |
|---|---|---|---|---|
| 5,541,904 A | * | 7/1996 | Fite et al. ................... 369/58 |
| 5,848,037 A | * | 12/1998 | Iwasaki et al. ............. 369/47 |
| 6,215,745 B1 | * | 4/2001 | Sako et al. ................. 369/48 |
| 6,266,299 B1 | * | 7/2001 | Oshima et al. ............. 369/13 |

FOREIGN PATENT DOCUMENTS

EP          0785547 A2      7/1997      ......... G11B/19/04

* cited by examiner

Primary Examiner—Gautam R. Patel

(57) ABSTRACT

A device and method of string a disc-ID on a record carrier. The record carrier comprises tracks. Information is stored on the record carrier. A disc-ID that comprises I groups of disc-ID bits is stored on the record carrier in a scattered way. I comprises at least 1 group. At least one of the I groups of disc-ID bits comprises a plurality of disc-ID bits.

26 Claims, 3 Drawing Sheets

METHOD OF STORING A DISC-ID ON A RECORD CARRIER, DEVICE AND RECORD CARRIER

Figure 1:
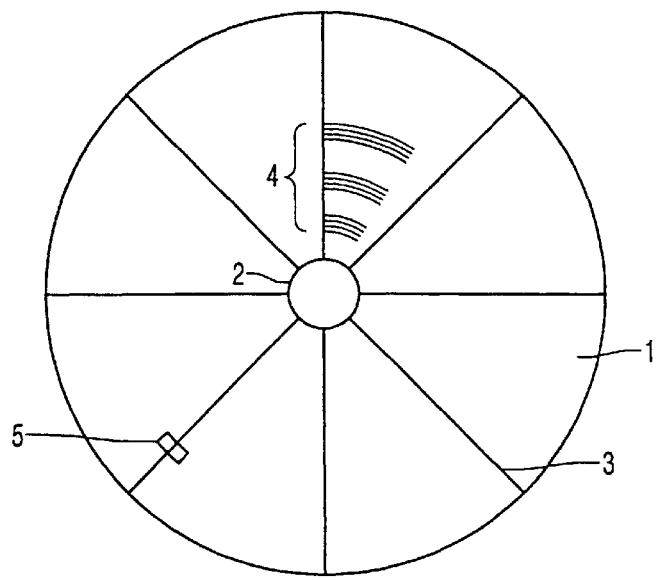

The invention relates to a method of storing a disc-ID on a record carrier comprising tracks in which information can be stored, said disc-ID comprising a predetermined number of disc-ID bits.

The invention also relates to a device for reading a record carrier, comprising a system for detecting and reading information present on the record carrier, the system comprising detection means for detecting a disc-ID on the record carrier, said disc-ID comprising a predetermined number of disc-ID bits.

The invention also relates to a device for writing a record carrier, comprising write means for inducing a detectable change on a layer of the record carrier, the write means being further adapted to write a disc-ID on the record carrier, said disc-ID comprising a predetermined number of disc-ID bits.

The invention further relates to a record carrier comprising a disc-ID stored on the record carrier, said disc-ID comprising a predetermined number of disc-ID bits.

The method according to the invention may be used in various types of generally known record carriers such as, for example, CD-R, DVD+RW, MO-disc.

Since the literature uses a plurality of terms for disc-IDs, such as identifier, disc-identifier, ID, disc code, identification tag, it will be noted for the sake of clarity what is to be understood by disc-ID in the description of this invention. The disc-ID consists of information of a predetermined bit length, stored on a record carrier, with the purpose of being able to distinguish this record carrier from other record carriers of the same type.

It should be clear from the above that the disc-ID of a record carrier is comparable with, and may perform the same function as, finger prints. It is important that the presence of a disc-ID provides the possibility of distinguishing individual record carriers from each other and not only the type of record carrier (for example, CD-ROM, CD-R or CD-RW).

The method according to the invention is not limited to circular record carriers but may also be used in non-circular record carriers such as tapes and cards.

The registration of a unique disc-ID on a record carrier is important for different reasons. European patent application EP 0 785 547 A2, hereinafter referred to as document D1, states, as an advantage of registering a unique disc-ID, that a computer system using these record carriers can keep track of a list of errors present on various record carriers. The system can then easily detect when a given record carrier does not function or should be replaced or copied. The registration of a disc-ID on a record carrier may also be important in a method of cryptocommunication. In this case, the disc-ID is used for providing, together with keys (for example, what is referred to as shared secret) present in a recorder or player, access to encrypted information on the record carrier. The use of a disc-ID on a record carrier is also recommendable in the field of copy protection, because copy protection is considerably simplified when individual record carriers can be distinguished from each other. To make this possible, each record carrier receives a unique identification code, the disc-ID. By means of this disc-ID, the data (for example, Audio/Video (A/V) data) is coupled to the physical medium, i.e. the record carrier.

A method of the type described in the opening paragraph is known, inter alia, from document D1. This document describes a method of storing one disc-ID (whose letters ID stand for identification) on a record carrier. If there is no disc-ID on the record carrier, a unique disc-ID is generated for this purpose and registered on a reserved area of the record carrier. When an MO disc is used, an unused sector in the defect management area (DMA) may be used as a reserved area. When a CD-R is used, the table of contents (TOC) in the lead-in zone may be used as a reserved area.

The disc-ID as described in document D1 is registered on a reserved area of the record carrier. The disc-ID is thus vulnerable to attempts of hacking and removing the disc-ID. Not only will it be easy to find a disc-ID registered in a reserved area on a record carrier, but it will also be easy to remove this disc-ID, for example, by giving all the bits constituting the disc-ID the same binary value. Moreover, it will be easier to make a number of discs all of which have the same disc-ID so that they cannot be distinguished from each other.

It is an object of the invention to realize a reliable disc-ID on record carriers, which is difficult to trace and remove.

To this end, the method according to the invention is characterized in that the disc-ID bits are stored on the record carrier in a scattered way.

The invention is based, inter alia, on the recognition that, by storing the disc-ID bits on the record carrier in a scattered way, it will be more difficult to trace the entire disc-ID and possibly remove it. Storage of the bits on the record carrier in a scattered way is understood to mean that one disc-ID is stored in a number of portions of limited bit size on the record carrier. Overwriting such a portion with a limited bit size is not easy and overwriting a single bit is not very well possible with the current equipment (for example, the CD-R and CD-RW recorders). A minimum bit size which can be realized in a single write action is of the order of several tens of bits, for example, 32 bits. The ratio between this minimal bit size and the size of the entire disc-ID is, for example, 20%. This corresponds to a disc-ID of 160 bits (5×32 bits). By scattering the different disc-ID bits on the record carrier in groups which are smaller than this minimal bit size, the disc-ID will be difficult to remove. This has, inter alia, the advantage that, if the disc-ID forms part of a copy protection system or of a system for crypto communication, these systems will be more reliable and can less easily be hacked.

Another embodiment is characterized in that the disc-ID bits are stored in groups of one bit on the record carrier in a scattered way.

By storing the disc-ID bits on the record carrier in a scattered way in groups of one bit, it will be more difficult to trace the entire disc-ID and possibly remove it.

A further embodiment is characterized in that the disc-ID bits are stored at positions reserved for storing non-data bits.

It is known that a number of bits (referred to as non-data bits) is not used for storing data on a number of types of frequently used record carriers, but have different other reasons for their presence. For example, in the description of the standard physical format of the Audio-CD (referred to as the Red Book), non-data bits are defined, inter alia, as error correction bits, merging bits and sync bits. For details, reference is made to the standard format of the Audio-CD (see International Standard IEC 908).

It is also clear from the foregoing that the data capacity of the record carrier is reduced if the disc-ID is stored on a reserved area of the record carrier where data can also be stored. By using the non-data bits for storing the disc-ID bits, a disc-ID is realized which does not result in a reduction of the total data capacity of the record carrier.

Moreover, it is to be noted that the disc-ID bits can also be stored at positions which, in accordance with the description of the standard physical format of the relevant record carrier, do not fulfill a function. These positions are suitable because the value of the bits at these positions can be freely chosen. This freedom provides the possibility of storing any desired disc-ID on the record carrier.

Another embodiment is characterized in that the disc-ID bits are stored in a preamble of the data bits on the record carrier.

By storing the disc-ID in the preamble of the data bits on the record carrier, the disc-ID is stored on a reserved area of the record carrier, where only non-data bits are stored. The data capacity of the record carrier is not reduced thereby. For a description of the preamble of the data bits and its function, reference is made to the description of the Figures.

A further embodiment is characterized in that the disc-ID bits associated with one disc-ID are stored in a predetermined number of tracks.

The different tracks on a record carrier are provided with a number so that the information in the tracks can be retraced. By storing the disc-ID bits associated with one disc-ID in a predetermined number of tracks, it will be easier and faster to retrace and read the disc-ID because it will be easy to find the start of the disc-ID with reference to the track number to be read.

Yet another embodiment is characterized in that the same number of disc-ID bits is stored in the tracks.

Information is stored in so-called tracks on different types of record carriers. Generally, a track comprises a portion comprising, inter alia, the address of this track, followed by a portion in which information can be stored. The different tracks on a record carrier are provided with a number so that the information present in the tracks can be retraced. By storing the same number of disc-ID bits in each track, retracing and reading of the disc-ID will be simpler and faster. For storing, for example, a 160-bit disc-ID, 20 tracks are required for storing the disc-ID when eight disc-ID bits are stored in each track.

A further embodiment is characterized in that a disc-ID can be stored several times on the record carrier.

It will be evident that, if the disc-ID is present on a record carrier only once, damages of the record carrier at the location where the disc-ID is registered may lead to loss of this disc-ID. This also applies to the case where the disc-ID consists of disc-ID bits which are stored on the record carrier in a scattered way. The moment the disc-ID is no longer readable from the record carrier, the information which may be present on the record carrier in an encrypted form is no longer accessible if the disc-ID bit is used for providing access to information of this type. The registration of a plurality of disc-IDs whose disc-ID bits are stored on the record carrier in a scattered way reduces the risk that there is no readable disc-ID left on the record carrier.

A further embodiment is characterized in that the same number of tracks is used for storing the disc-IDs.

By using a constant number of tracks for storing a disc-ID, retracing and reading of the disc-ID bits will be simpler and faster. With reference to the numbers of the tracks on the record carrier, it can then be easily determined which disc-ID bits are present in which track.

Another embodiment is characterized in that a disc-ID byte is formed by eight disc-ID bits having the same position in a direction perpendicular to a read direction of the record carrier.

By causing disc-ID bits having the same position in a direction perpendicular to a read direction of the record carrier to form a disc-ID byte, the effect of errors is reduced. In fact, the errors fall within one byte in the case of damage.

When a circular record carrier is used, the disc-ID byte is formed by eight disc-ID bits having the same tangential position. Since, in the case of error correction, this error correction is preferably performed at byte level, a local damage having a size of eight tracks in the tangential position will result in one byte with eight errors. If the disc-ID bytes are formed in the sequence in which the disc-ID bits are read from the record carrier (i.e. in the sequence in which also the data are read from the record carrier), a local damage having a size of eight tracks in the tangential position will result in eight bytes with one error each.

The device according to the invention is characterized in that the detection means are also adapted to detect a disc-ID whose disc-ID bits are stored on the record carrier in a scattered way.

Another device according to the invention is characterized in that the write means are also adapted to write the disc-ID bits on the record carrier in a scattered way.

The record carrier according to the invention is characterized in that the disc-ID bits are stored on the record carrier in a scattered way.

These and other aspects of the invention are apparent from and will be elucidated with reference to the embodiments described hereinafter.

Figure 3:
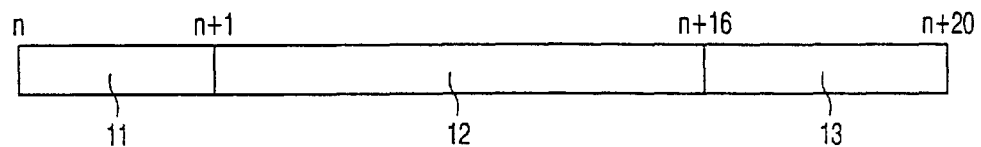
Figure 4:
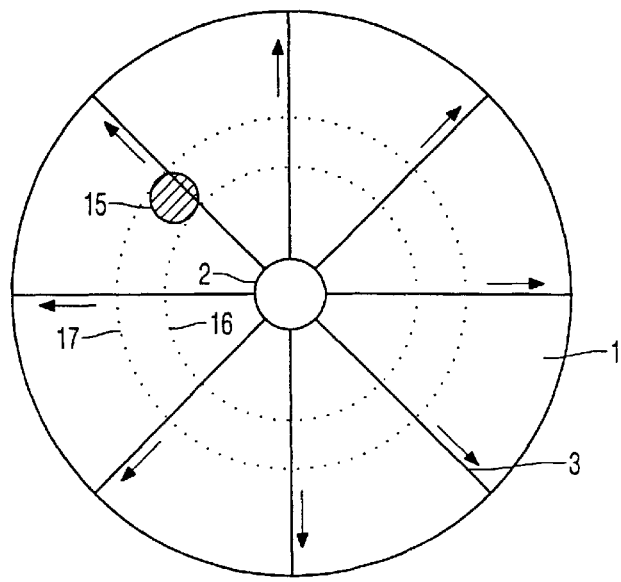
Figure 2:
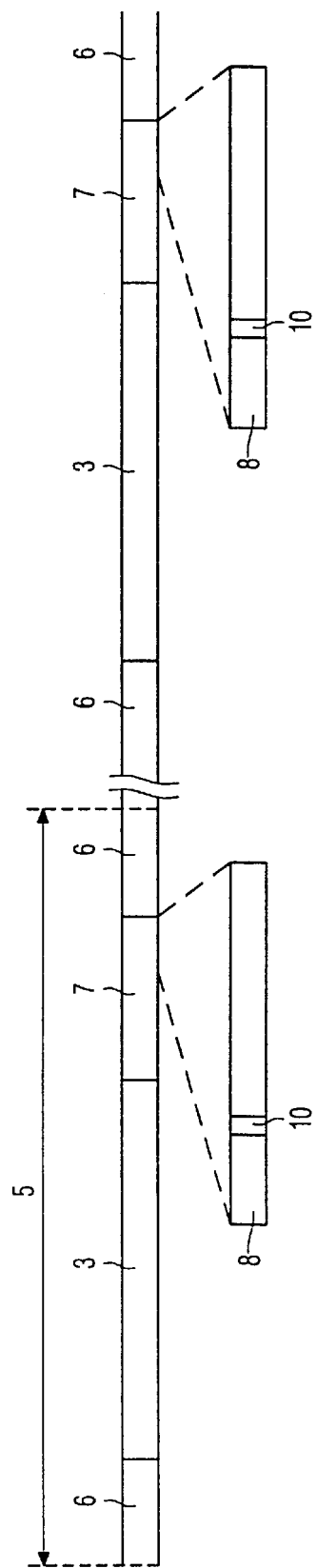
Figure 5:
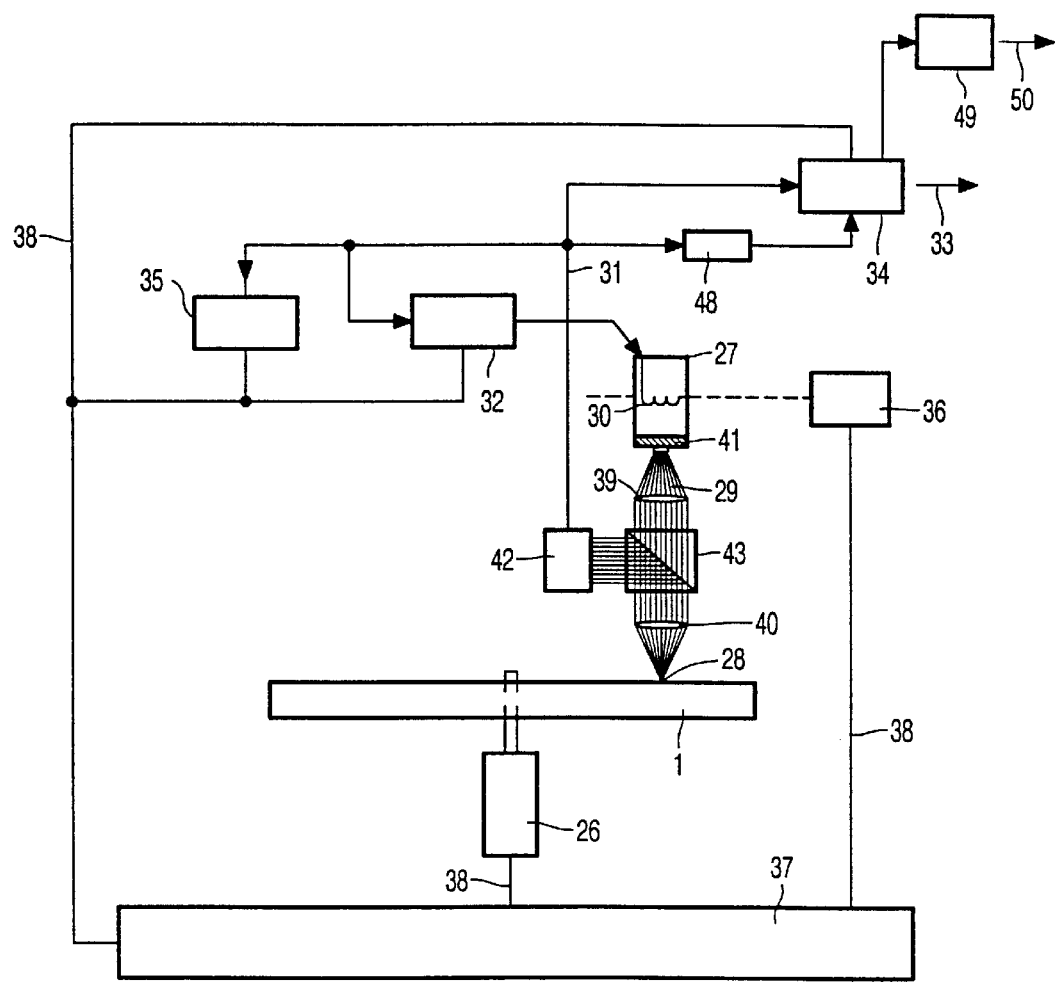

In the drawings:

FIG. 1 shows a first embodiment of the record carrier with a disc-ID according to the invention, FIG. 2 shows a magnification of a part of FIG. 1, FIG. 3 shows an embodiment of a complete disc-ID, FIG. 4 shows a second embodiment of the record carrier with a disc-ID, FIG. 5 shows a device for reading and/or writing a record carrier according to the invention.

FIG. 1 shows a record carrier with a disc-ID according to the invention, for example, a writable high-density optical disc. The record carrier 1 has a circular aperture 2. This record carrier comprises embossed headers 3 evenly spread at eight locations on the record carrier. These embossed headers are provided during production of the record carrier. The record carrier 1 is partitioned into three zones with a large number of tracks 4. In this case, these three zones are, for example the lead-in zone, the data zone and the lead-out zone. The tracks in the data zone and the lead-out zone have positive numbers, starting at track number 0; the track numbers ascend in the direction of the outer side of the record carrier. The tracks in the lead-on zone have negative numbers; the track numbers descend in the direction of the circular aperture of the record carrier. After the embossed header 3, there is the data with the run-in.

FIG. 2 shows a magnification of zone 5 of FIG. 1. Zone 5 comprises data zones 6, the embossed header 3 and the run-in zone 7. This embossed header 3 is present between the data zone 6 and the run-in zone 7. A data zone 6 is preceded by an associated run-in zone 7 and an associated embossed header 3. This pattern is subsequently repeated a large number of times. In FIG. 2, this pattern is shown twice.

The run-in zone 7 comprises, inter alia, a preamble 8. The preamble in this embodiment is the preamble of the data bits 6. The preamble 8 is present in the run-in zone 7 to ensure the synchronization when reading optical signs on the record carrier 1. In addition to the preamble 8, the run-in zone 7 comprises, inter alia, address information. One bit in the preamble 8 is defined in this embodiment as disc-ID bit 10. By writing one disc-ID bit at predefined positions (in this case, a position in the preamble 8) when writing the record carrier 1, it is possible to generate a disc-ID which cannot easily be traced and removed.

It is to be noted that a run-out zone may also be incorporated directly subsequent to the data zones 6. After this run-out zone, there is an embossed header 3.

By storing one disc-ID bit in this case in each track 4 after each embossed header 3 in the run-in zone 7, it is possible to store eight disc-ID bits in each track. Consequently, 20 tracks are required for realizing a disc-ID comprising 160 bits. In this example, the disc-ID bits are stored in groups of one disc-ID bit at positions reserved for storing non-data bits.

In another embodiment, the disc-IDs are formed by storing the disc-ID bits in groups of a small number of bits on the record carrier. In a further embodiment, the disc-IDs are formed by storing the disc-ID bits at positions which are reserved for storing data bits.

The storage of disc-ID bits is not limited to the run-in zone directly subsequent to the embossed headers but, in principle, any position on the record carrier may be defined for storing a disc-ID bit according to this invention. It is also possible to store the disc-ID bits of one or more disc-IDs in both the lead-in zone, the data zone and the lead-out zone, or to make a choice from one or more of these zones. Moreover, it is possible to store a number other than 8 disc-ID bits in each track, for example, 16 or 32.

Hitherto, a description has been given of the physical position where a disc-ID bit 10 can be stored. The disc-ID bits 10 present on the record carrier 1 will subsequently have to be read and collected to form a usable complete disc-ID. In this first embodiment, as described with reference to FIG. 1 and FIG. 2, the disc-ID bytes are formed by joining together the eight disc-ID bits 10 which are present in a track 4. The disc-ID bytes jointly constitute the complete disc-ID. An embodiment of a complete disc-ID will hereinafter be described with reference to FIG. 3.

FIG. 3 shows an embodiment of a complete disc-ID. The complete disc-ID in this embodiment is formed by reading a number of tracks on the record carrier 1 and by reading eight disc-ID bits 10 from each track. In this example, the complete disc-ID comprises an eight-bit flag field 11, a 128-bit disc-ID 12 and a 32-bit check sum 13. The track numbers in which the disc-ID bits are stored are indicated above the complete disc-ID. The complete disc-ID starts at track number n and ends at track number n+20. The complete disc-ID comprises a total number of 168 bits and is thus stored in 21 tracks.

The eight-bit flag field 11 has the following function. By choosing a bit combination which only occurs rarely on the record carrier 1 for the eight-bit flag field 11, this flag field functions as a starting point for a new complete disc-ID. The moment when a device reads this fixed bit combination, the start of a new complete disc-ID has been found. By adding a flag field to the start of the complete disc-ID, it is thus possible to easily find the disc-IDs present on the record carrier 1. By determining that the flag field can only occur in given tracks, namely those tracks where there may be the start of a complete disc-ID, searching for a complete disc-ID which is present can be effected at an even faster rate.

The 32-bit check sum 13 allows identification of errors which occur when reading the different disc-ID bits. Instead of the check sum, it is also possible to store an error-correcting code after the disc-ID, with which errors occurring when reading the different disc-ID bits can be corrected. A combination of check sum and error-correcting code is also possible. Two other possible embodiments of a complete disc-ID will be described hereinafter.

In another embodiment, the complete disc-ID comprises 88-bit reserved data, in addition to an eight-bit flag field, a 128-bit disc-ID and a 32-bit check sum. This complete disc-ID comprises a total of 256 bits and can thus be stored in 32 tracks. The 88-bit reserved data can be used for exchanging information between devices that can read and/or write the record carrier 1. The reserved data may be used for replacing a violated key, if the disc-ID forms part of a cryptocommunication system. Moreover, the reserved data may be used for switching given functions on and off (for example, watermark detection) in the device. If this complete disc-ID is stored several times on the record carrier, it is also possible that the stored disc-ID is identical for each disc-ID but the reserved data are not identical. This provides the possibility of storing a larger quantity of information in these reserved data.

In a further embodiment, the complete disc-ID comprises an eight-bit flag field, a 128-bit disc-ID and a 16-bit check sum, a 96-bit error correction code and 16-bit reserved data. This complete disc-ID comprises a total of 256 bits and can thus be stored in 32 tracks.

It will be evident from the foregoing that, minimally, one complete disc-ID must be present on the record carrier 1 for encrypting, for example, A/V information. To this end, the method according to the invention may be used as follows. If a record carrier 1 without previously stored data or data meanwhile erased is inserted into a recorder/player, a new disc-ID will have to be generated to provide a copy protection system. This disc-ID may be generated, for example, by means of a random number generator which is present, for example, in the recorder/player. The disc-ID bits 10 are then stored in groups of one bit in the preambles 8 of the run-in zone 7. This is preferably done in the first tracks of the record carrier, reckoned from the circular aperture 2. If a record carrier 1 with data is inserted into a recorder/player, the first complete disc-ID that is present will be read. When this complete disc-ID has been read successfully, it will be stored in a register.

FIG. 4 shows a second embodiment of the record carrier with a disc-ID. The record carrier 1 again has a circular aperture 2 and embossed headers 3. The disc-ID bits which are stored in the run-in zone 7 again jointly form the complete disc-ID. A defect 15 is present on the record carrier 1. This defect 15 may be, for example a damaged part or a contamination. This defect 15 extends from a track m denoted by 16 through a track m+7 denoted by 17. In this embodiment, the disc-ID bytes are formed by the disc-ID bits having the same tangential position. An arrow denotes the direction in which the disc-ID bits having the same tangential position are joined to form the disc-ID bytes. The disc-ID bits forming these disc-ID bytes are therefore radially interleaved, resulting in a limitation of the error propagation. This is evident as follows. The defect 15 comprises eight tracks in the tangential direction (the size of the defect and the distance between track m and track m+7 are strongly exaggerated in this FIG. 4). Now that the disc-ID bits having the same tangential position form a disc-ID byte in this case, reading of track m through track m+7 will result in eight disc-ID bytes, one disc-ID byte having eight errors and seven disc-ID bytes being without errors (assuming that the defect 15 is the only defect in track m through track m+7). Consequently, this defect 15 will result in a total of one byte with errors. When the disc-ID bytes are formed by joining the eight disc-ID bits in each track (as is the case in the first embodiment), this results in eight bytes with one error each, namely the bytes which are formed by reading track m, track m+1, track m+2, track m+3, track m+4, track m+5, track m+6 and track m+7. It will be clear from the foregoing that the error propagation is limited when the disc-ID bits having the same tangential position form the disc-ID bytes.

The error propagation may also be limited by storing the disc-ID bits, prior to writing the disc-ID or disc-IDs, in a memory and by subsequently scattering the disc-ID bits on the record carrier in accordance with a predetermined way.

FIG. 5 shows a device for reading and/or writing a record carrier with disc-ID according to the invention. The device is provided with drive means 26 for rotating the record carrier 1, and with a read head 27 for reading the tracks on the record carrier. The read head 27 comprises an optical system of a known type, intended to generate a light spot 28 focused on a track of the record carrier by means of a light ray 29 which is guided through optical elements such as a collimator lens 39 for collimating the light ray, and an objective lens 40 for focusing the light ray. This light ray 29 is generated by a radiation source 41, for example, an infrared laser diode having a wavelength of 650 nm and an optical power of 1 mW. The read head 27 further comprises an actuator which is intended to focus the light ray 29 on the record carrier, and a tracking actuator 30 for fine-positioning the light spot 28 in the radial direction in the center of the track. The track can be scanned with the laser beam but also by varying the position of the objective lens 40.

After having been reflected by the record carrier, the light ray 29 is detected by a detector 42 of a known type, for example, a quadrant detector which generates detector signals 31, including a read signal, a tracking error signal, a focus error signal; a synchronizing signal and a lock-in signal. For this purpose, use may be made of, for example, a beam-splitting cube 43, a polarizing beam-splitting cube, a pellicle or a retarder.

The device is provided with tracking means 32 coupled to the read head 27 for receiving the tracking error signal from the read head 27 and for controlling the tracking actuator 30. During reading, the read signal is converted into output information, denoted by an arrow 33, in the read means 34, for example, comprising a channel decoder and an error corrector. The device is provided with an address detector 35 for retrieving address information from the detector signals 31, and positioning means 36 for coarsely positioning the read head 27 in the radial direction of the track.

The device is also provided with detection means 48 for receiving the detector signals 31 from the read head 27. The detector signals 31 are used by the detection means 48 for synchronizing the read means 34. When a disc-ID bit is read, the detection means 48 ensure that the detector signals 31 applied to the read means 34 are interpreted and registered as signals associated with the disc-ID bits 10. The registrations are subsequently used for forming the complete disc-ID described, for example, with reference to FIG. 3.

The device is further provided with a system control unit 37 for receiving commands from a controlling computer system or from a user, and for controlling the device by means of control lines 38, for example, a system bus connected to the drive means 26, the positioning means 36, the address detector 35, the tracking means 32 and the read means 34. To this end, the system control unit 37 comprises a control circuit, for example a microprocessor, a program memory and control ports for performing the procedures as described below. The system control unit 37 may also be implemented in a state machine in logic circuits.

In another embodiment, the device may not only comprise read means 34 but also write means for providing optically readable signs on a record carrier of a writable type, thus enabling the device to fulfill both read functions and write functions. The read head 27 will then be replaced by a read/write head 27. In this case, the read/write head 27 will comprise the write means. These write means will then be adapted to write the disc-ID bits on the record carrier in a scattered way. The detection means 48 then ensure that the write means registers the disc-ID bits at predetermined positions.

In a further embodiment, the device also comprises control means 49 controlling the access of information on the record carrier. These control means 49 generate the complete disc-ID by means of the signals from the read means 34. This complete disc-ID which is read can be subsequently compared with information present in the device and subsequently generate an output signal 50, for example, giving access to the information which is present on the record carrier, authority to write information on the record carrier or authority to copy the information on the record carrier.

Although the invention has been elucidated with reference to the embodiments described above, it will be evident that other embodiments may also be used to achieve the same object. For example, it is possible to vary the number of disc-ID bits in each track and to join the disc-ID bits in a different way so as to form the total disc-ID, dependent on the error correction method to be used. Furthermore, the invention is considered to reside in each and every novel characteristic feature and/or combination of characteristic features.

What is claimed is:

1. A method of storing a disc-ID on a record carrier comprising:
   providing tracks in which information can be stored; and
   storing a disc-ID having I groups of disc-ID bits stored on the record carrier in different sectors, wherein I is at least 2, and wherein at least one of said I groups of disc-ID bits comprises a plurality of disc-ID bits.

2. The method of claim 1, in which the disc-ID bits associated with one disc-ID are stored in a predetermined number of tracks.

3. The method of claim 2, in which a disc-ID byte is formed by eight disc-ID bits having the same position in a direction perpendicular to a read direction of the record carrier.

4. The method of claim 2, in which the same number of disc-ID bits are stored in each track of the number of tracks.

5. The method of claim 1, in which the disc-ID bits are stored at positions reserved for storing non-data bits.

6. The method of claim 1, in which the disc-ID bits are stored in a preamble of the data bits on the record carrier.

7. The method of claim 1, in which disc-IDs are stored multiple times on the record carrier.

8. The method of claim 7, in which the same number of tracks is used for storing the disc-IDs.

9. A device comprising:
   means for reading information present on a record carrier
   means for detecting a disc-ID in the read information, the disc-ID including I groups of disc-ID bits stored on the record carrier in different secorts, wherein I is at least 2, and wherein at least one of said I groups of disc-ID bits comprises a plurality of disc-ID bits.

10. The device of claim 9, in which the device further comprises means for providing access to information on the record carrier.

11. A device comprising:
   means for receiving a disk-ID having I groups of disc-ID bits; and
   write means to induce a detectable change on a layer of the record carrier for writing said I groups of disc-ID bits on the record carrier in different sectors, wherein I is at least 2, and wherein at least one of said I groups of disc-ID bits comprises a plurality of disc-ID bits.

12. The device of claim 11, in which the write means at positions reserved for storing non-data bits.

13. The device of claim 11, in which the device further comprises means for providing access to information on the record carrier.

14. A record carrier comprising:

a substrate;

a disc-ID stored on the substrate of the record carrier the stored disc-ID including I groups of disc-ID bits stored on the record carrier in different sectors, wherein I is at least 2, and wherein at least one of said I groups of disc-ID bits comprises a plurality of disc-ID bits.

15. The record carrier of claim 14, in which the disc-ID bits are stored at positions reserved for storing non-data bits.

16. The record carrier of claim 14, in which a plurality of disc-IDs is stored on the record carrier.

17. A method of storing a disc-ID on a record carrier comprising:

providing tracks in which information can be stored; and storing a disc-ID having I groups of disc-ID bits stored on the record carrier in a scattered way, wherein I is at least 2, and wherein at least two of said I groups of disc-ID bits are stored in different sectors of the record carrier.

18. The method of claim 17, wherein said I groups each comprise one disc-ID bit.

19. The method of claim 17, wherein said I groups of the disc-ID bits associated with one disc-ID are stored in a predetermined number of tracks.

20. The method of claim 17, wherein disc-IDs are stored multiple times on the record carrier.

21. The method of claim 20, wherein the same number of tracks is used for storing the disc-IDs.

22. A record carrier comprising:

a substrate;

a disc-ID stored on the substrate of the record carrier the stored disc-ID comprising I groups of disc-ID bits stored on the record carrier in a scattered way, wherein I is at least 2, and wherein at least two of said I groups of disc-ID bits are stored in different sectors of the record carrier.

23. The record carrier of claim 22, wherein said I groups each comprise one disc-ID bit.

24. The record carrier of claim 22, wherein said I groups of the disc-ID bits associated with one disc-ID are stored in a predetermined number of tracks.

25. The record carrier of claim 22, wherein said disc-ID is stored multiple times on the record carrier.

26. The method of claim 25, wherein the same number of tracks is used for storing the disc-IDs.

* * * * *